United States Patent [19]

Deicke et al.

[11] Patent Number: 5,766,778
[45] Date of Patent: Jun. 16, 1998

[54] MATERIAL FOR SLIDING SURFACE BEARINGS

[75] Inventors: Klaus Deicke, Untereisesheim; Werner Schubert, Wiesloch; Manfred Muller, Untereisesheim, all of Germany

[73] Assignee: Kolbenschmidt Aktiengesellschaft, Neckarsulm, Germany

[21] Appl. No.: 736,881

[22] Filed: Oct. 25, 1996

Related U.S. Application Data

[63] Continuation of Ser. No. 417,297, Apr. 5, 1995, abandoned.

[30] Foreign Application Priority Data

Apr. 6, 1994 [DE] Germany ............ 44 11 762.0

[51] Int. Cl.$^6$ .............. B32B 15/20; F16C 9/04; F16C 33/06
[52] U.S. Cl. .............. 428/677; 384/912; 74/579 R
[58] Field of Search .............. 428/677; 384/912, 384/430; 420/477; 74/579 R

[56] References Cited

U.S. PATENT DOCUMENTS

| | | | |
|---|---|---|---|
| 1,987,639 | 1/1935 | Roberts | 420/477 |
| 2,149,103 | 2/1939 | Schulze | 420/477 |
| 2,315,700 | 4/1943 | Hehemann | 420/477 |
| 3,386,161 | 6/1968 | Ruf | 29/487 |
| 4,741,394 | 5/1988 | Tanigawa et al. | 420/477 |
| 5,282,908 | 2/1994 | Nakashima et al. | 420/477 |

FOREIGN PATENT DOCUMENTS

| | | | |
|---|---|---|---|
| 2519395 | 12/1982 | France . | |
| 1187805 | 2/1965 | Germany | 420/477 |
| 57-194234 | 11/1982 | Japan | 420/477 |
| 58-22347 | 2/1983 | Japan | 420/477 |
| 59-118842 | 7/1984 | Japan | 420/477 |
| 24524 | 10/1902 | United Kingdom | 420/477 |
| 2270721 | 3/1994 | United Kingdom . | |

*Primary Examiner*—John J. Zimmerman
*Attorney, Agent, or Firm*—Sprung Kramer Schaefer & Briscoe

[57] ABSTRACT

A material for sliding surface bearings comprising a layer of a wrought copper-zinc alloy of thickness of about 0.1 to 1.5 mm inseparably joined to a backing layer of steel or stainless steel. A co-rolled joining strip of copper may be between the two layers.

1 Claim, No Drawings

MATERIAL FOR SLIDING SURFACE BEARINGS

This application is continuation of application Ser. No. 08/417,297, filed Apr. 5, 1995 now abandoned.

DESCRIPTION

This invention relates to a material for sliding surface bearings comprising a wrought copper-zinc alloy, preferably for use in the manufacture of bearing bushings and low-friction thrust washers.

BACKGROUND OF THE INVENTION

The use of such material for sliding surface bearings made of a wrought copper-zinc alloy, particularly of the type CuZn31Si, is known. That material for sliding surface bearings is set forth in German Standard 17 660, is employed as a monometal and has good sliding properties in bearings under a medium load and is used to make bearing bushings having a wall thickness of 1 to 15 mm for use in steering joints for motor trucks, in machine tools and the like. However, if such bearing bushings are subjected to higher loads, e.g., in connecting rod bearings, the load-carrying capacity of that monometal material for sliding surface bearings will not be sufficient, as a rule, so that changes in the structure of the material for sliding surface bearings and particularly at the surface of said material will occur. Besides, the use of monometal materials for sliding surface bearings is no longer economical.

It is also known to use in sliding surface bearings composite materials consisting of a backing layer of steel and a sintered or cast copper-lead-tin alloy layer bonded to said backing layer. However, even such composite materials for sliding surface bearings do not withstand the high loads encountered, e.g., in modern internal combustion engines. Damage resulting from corrosion is also encountered more and more often and may cause the internal combustion engine to become inoperative.

It is an object of the present invention so to improve the mechanical technological properties of the material for sliding surface bearings described hereinbefore that its load-carrying capacity is improved but the disadvantages of the materials discussed hereinbefore for sliding surface bearings will be avoided so that the field of application will be increased.

BRIEF DESCRIPTION OF THE INVENTION

That object is realized in accordance with the present invention by inseparably joining a wrought copper-zinc alloy in a layer having a thickness of 0.1 to 1.5 mm to a backing layer made of steel or stainless steel.

DETAILED DESCRIPTION OF THE INVENTION

The joinder between the wrought-zinc alloy and the backing layer desireably consists of a composite formed by co-rolling.

The wrought copper-zinc alloy preferably has the following composition;

28 to 32% by weight zinc
0.7 to 1.3% by weight silicon
66 to 70% by weight copper It may be desirable to provide between the backing layer of steel and the layer of the bearing material for sliding surface bearings an interlayer which has a thickness of 10 to 200 micrometers, advantageously of copper or a copper alloy.

To make the composite material consisting of steel and CuZn31Si for use in sliding surface bearings, a cold-rolled steel strip and a strip of CuSn31Si are simultaneously degreased, ground and/or brushed and joined in a cladding rolling mill in a continuous process. Under the pressure applied by the rolls the steel strip and the strip of CuZn31Si are deformed to different degrees and the resulting relative movement causes the two materials to be bonded by friction welding. When the strip of composite material for sliding surface bearing has been cooled and coiled, that strip is subjected to a heat treatment under a protective gas atmosphere. That treatment results in a diffusion process, by which the bond between the steel and that layer of CuZn31Si is strengthened and the structure of the layer of CuZn31Si is improved. To ensure small thickness tolerances of the composite strip and to further increase th e strength properties it is possible to size the strips of composite material for sliding surface bearings on a rolling mill having a constant nip.

In the composite material composed in accordance with the invention for sliding surface bearings, bushings and low-friction thrust washers, only the favorable sliding properties and the corrosion resistance of the wrought copper-zinc alloys, particularly of the type CuZn31Si, are combined with the high load-carrying capacity of steel-based composite materials for sliding surface bearings. The composite material according to the invention for sliding surface bearings can be made at very low cost with small tolerances and exhibits surprisingly good properties as it is deformed to make sliding elements.

Advantageously the heat treatment of the friction bonded strip is effected at a temperature from about 500° to 700° C. under an atmosphere of nitrogen, argon or other inert gas, for a time of at least about 2 hours, preferably from about 4 to 10 hours.

The invention will be further described in the following illustrative example.

EXAMPLE

A strip of cold-rolled degreased carbon steel 250 mm wide and 4.1 mm thick, is passed simultaneously with a strip 1.7 mm thick and 250 mm wide comprising by weight 30% zinc
1% silicon
69% copper with a strip of copper 100 micrometers thick and 250 mm wide therebetween into a cladding rolling mill, thereby effecting friction welding to produce a composite strip. It is cooled, coiled and heat treated at 650° C. for 6 hours under nitrogen. The strip is formed on a rolling mill into a sliding surface bearing bushing for the steering joint of a motor truck.

It will be appreciated that the instant specification and claims are set forth by way of illustration and not limitation, and that various modifications and changes may be made without departing from the spirit and scope of the present invention.

We claim:

1. A connecting rod and bearing bushing assembly the bearing of which comprises a layer of wrought copper-zinc alloy having a thickness of from about 0.1 mm to about 1.5 mm and which is bonded to a backing layer of steel or stainless steel, the wrought copper-zinc alloy comprising 28–32% by weight zinc,
0.7–1.3% weight silicon and
66–70% by weight copper.

* * * * *